US012161976B2

(12) United States Patent
Zou

(10) Patent No.: US 12,161,976 B2
(45) Date of Patent: Dec. 10, 2024

(54) METHOD FOR PREPARING POROUS POLYMER SEMIPERMEABLE MEMBRANE AND PRODUCT THEREOF

(71) Applicant: DREISAM (BEIJING) MEDICAL TECHNOLOGY, CO., LTD., Beijing (CN)

(72) Inventor: Peng Zou, Beijing (CN)

(73) Assignee: Dreisam (Beijing) Medical Technology Co., Ltd., Beijing (CN)

( * ) Notice: Subject to any disclaimer, the term of this patent is extended or adjusted under 35 U.S.C. 154(b) by 0 days.

(21) Appl. No.: 17/996,946

(22) PCT Filed: Sep. 8, 2021

(86) PCT No.: PCT/CN2021/117123
§ 371 (c)(1),
(2) Date: Oct. 24, 2022

(87) PCT Pub. No.: WO2022/073407
PCT Pub. Date: Apr. 14, 2022

(65) Prior Publication Data
US 2023/0311068 A1 Oct. 5, 2023

(30) Foreign Application Priority Data
Oct. 10, 2020 (CN) .......................... 202011076414.4

(51) Int. Cl.
*B01D 67/00* (2006.01)
*B01D 71/82* (2006.01)
*G01N 27/327* (2006.01)

(52) U.S. Cl.
CPC ..... *B01D 67/0009* (2013.01); *B01D 67/0006* (2013.01); *B01D 71/82* (2013.01);
(Continued)

(58) Field of Classification Search
CPC ................ B01D 67/0009; G01N 27/327–3278
See application file for complete search history.

(56) References Cited

U.S. PATENT DOCUMENTS

| | | | | |
|---|---|---|---|---|
| 2007/0135699 A1* | 6/2007 | Ward | ................... | A61B 5/6833 600/345 |
| 2015/0025168 A1* | 1/2015 | Lienkamp | ............... | A61L 2/232 521/149 |
| 2016/0288062 A1 | 10/2016 | Ait-Haddou et al. | | |

FOREIGN PATENT DOCUMENTS

| | | |
|---|---|---|
| CN | 106397805 A | 2/2017 |
| CN | 106823856 A | 6/2017 |

(Continued)

OTHER PUBLICATIONS

Poly(oxonorbornene-diester) Based SMAMPs as Antimicrobial Drugs and Coating Materials (Year: 2019).*

(Continued)

*Primary Examiner* — Alex A Rolland
(74) *Attorney, Agent, or Firm* — Grossman, Tucker, Perreault & Pfleger, PLLC

(57) ABSTRACT

Provided by the present invention is a method for preparing a porous polymer semipermeable membrane, wherein a hydrophobic polynorbornene polymer and a hydrophilic small-molecule crosslinking agent containing a thiol functional group are mixed and dissolved in a solvent capable of dissolving both of them to obtain a coating solution; the coating solution is applied onto the surface of a biosensor electrode and dried such that the hydrophobic component and the hydrophilic component undergo phase separation; then, a membrane is formed and crosslinking is carried out, the unreacted hydrophilic small-molecule crosslinking agent is removed, and re-drying is carried out to obtain a porous polymer semipermeable membrane; also disclosed is a product. For the product obtained by the preparation method of (Continued)

the present invention, the hydrophobicity of the polymer enables good adhesion of the porous polymer semipermeable membrane to the surface of the biosensor, and the porous structure ensures the diffusion of biological substances to the surface of the biosensor, and regulates the diffusion rate of the biological substances in the semipermeable membrane without changing the thickness of the polymer membrane significantly.

8 Claims, 2 Drawing Sheets

(52) U.S. Cl.
CPC .... *B01D 2323/02* (2013.01); *B01D 2323/081* (2022.08); *B01D 2323/12* (2013.01); *B01D 2323/30* (2013.01); *B01D 2323/345* (2013.01); *B01D 2323/36* (2013.01); *G01N 27/327* (2013.01)

(56) References Cited

FOREIGN PATENT DOCUMENTS

| CN | 112426896 A | 3/2021 |
| JP | 2000107578 A | 4/2000 |
| WO | 2019145481 A1 | 8/2019 |

OTHER PUBLICATIONS

English translation of International Search Report from corresponding PCT Appln. No. PCT/CN2021/117123, dated Nov. 26, 2021.
Ndaya, et al., "Synthesis of Ordered, Functional, Robust Nanoporous Membranes from Liquid Crystalline Brush-like Triblock Copolymers", Plymer Chemistry, vol. 9, 2018, pp. 1404-1411.

* cited by examiner

METHOD FOR PREPARING POROUS POLYMER SEMIPERMEABLE MEMBRANE AND PRODUCT THEREOF

FIELD OF TECHNOLOGY

The present invention relate to the technical field of biosensors, in particular to a method for preparing a porous polymer semipermeable membrane and a product thereof.

BACKGROUND

Polymer semipermeable membrane is an important component of biosensors, especially implantable biosensors. Taking electrochemical biosensor as an example, the most important function of the polymer semipermeable membrane is to control the diffusion rate of biological substances from the external environment to the surface of the sensor electrode, which is attributed to the fact that the linear response concentration of the sensor is usually much smaller than the actual concentration of biological substances in the environment. For biological substances with small molecular weight, their diffusion rate mainly depends on the hydrophilicity and thickness of the polymer semipermeable membrane: biological substances can't diffuse in membranes with no hydrophilicity or low hydrophilicity, and after the hydrophilicity of the polymer membrane reaches a certain level, the diffusion rate of biological substances increases with the increase of membrane hydrophilicity. In order to reduce the diffusion rate of biological substances in hydrophilic semipermeable membranes, the method of increasing the thickness of the semipermeable membrane is often adopted. However, this method is often not advisable for implantable biosensors: if the diffusion of biological substances from the external environment to the surface of the sensor electrode is viewed as a one-dimensional diffusion system, according to Fick's second law, the diffusion rate (the difference in concentration of biological substances between the external environment and the electrode surface) is inversely proportional to the square of the thickness of the polymer semipermeable membrane. That is to say, with the structure of the polymer membrane unchanged, in order to reduce the diffusion rate by half, it needs to quadruple the thickness of the semipermeable membrane. Many times of coating are required to obtain the required thickness. Additionally, many times of coating also brings inconvenience to the control of membrane thickness in the production process, which makes it difficult to guarantee consistent membrane thickness in the same batch. In addition, implantable biosensors often have friction with surrounding muscles, fat and other soft tissues when in use, while hydrophilic polymer membranes tend to have poor adhesion to the surface of hydrophobic biosensors, which will reduce the stability of the sensor, and in severe cases, lead to peeling off of the semipermeable membrane from the sensor surface.

SUMMARY

An objective of the present invention is to provide a method for preparing a porous polymer semipermeable membrane, wherein a mixed solution of a hydrophobic polynorbornene polymer material and a hydrophilic small molecule containing a thiol functional group is coated onto the surface of a biosensor electrode and cross-linked. The polymer hydrophobicity of the resultant product makes the semipermeable membrane have good adhesion to the surface of the biosensor, the porous structure can ensure the diffusion of biological substances to the surface of the biosensor, and the diffusion rate of the biological substances in the semipermeable membrane can be adjusted without changing the membrane thickness significantly.

To achieve the above objective, the technical solution of the present invention is as follows:

A method for preparing a porous polymer semipermeable membrane, comprising the following steps: mixing and dissolving a hydrophobic polynorbornene polymer and a hydrophilic small-molecule crosslinking agent containing a thiol functional group in a solvent capable of dissolving both of them to obtain a coating solution; applying the coating solution onto the surface of a biosensor electrode, and drying the coating solution, wherein during the drying process, the hydrophobic component and the hydrophilic component undergo phase separation; and, forming a membrane and carrying out crosslinking, removing the unreacted hydrophilic small-molecule crosslinking agent, and carrying out re-drying to obtain a porous polymer semipermeable membrane. If the proportion of the hydrophilic small-molecule crosslinking agent is too small, phase separation cannot be realized, and the porous structure cannot be formed, or can be formed but with too sparse pores, so that biological substances cannot pass through the semipermeable membrane or their diffusion rate in the semipermeable membrane is too low. If the proportion of the hydrophilic small-molecule crosslinking agent is too high, other phase separation structures will be formed, and the diffusion rate of biological substances in the semipermeable membrane will be too fast.

The method for preparing a porous polymer semipermeable membrane as described above, wherein the structural formula of the hydrophobic polynorbornene polymer is as follows:

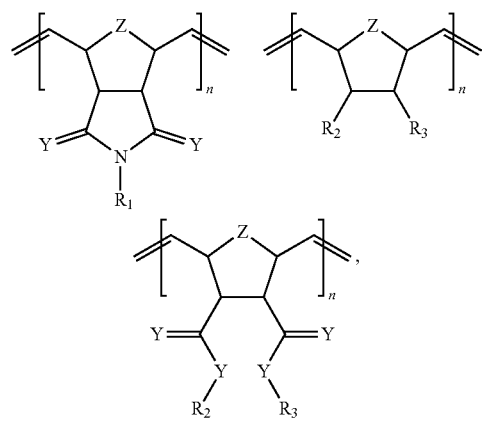

where Z is one of $CH_2$, $CH_2CH_2$, O, S, $N-R_4$ or $C=C(R_5R_6)$; Y is one of O, S and NH; $R_1$ is one of H, linear/branched/cyclic hydrocarbyl groups, lipid/ether-containing groups or

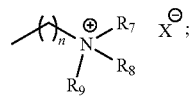

$R_2$ and $R_3$ are one of linear/branched/cyclic hydrocarbyl groups and

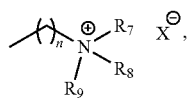

and $R_2$ and $R_3$ are identical or different; $R_4$ is one of linear/branched/cyclic hydrocarbyl groups; $R_5$ and $R_6$ are H or an alkyl group, and $R_5$ and $R_6$ are identical or different; n=1-10, $R_7$, $R_8$ and $R_9$ are H or an alkyl group, and $R_7$, $R_8$ and $R_9$ are identical or different; the polynorbornene polymer has a molecular weight of 10,000 g/mol-2,000,000 g/mol; and the hydrophilic small-molecule crosslinking agent contains at least two thiol functional groups.

The method for preparing a porous polymer semipermeable membrane as described above, wherein the molecular weight of the polynorbornene polymer is 200,000 g/mol-1,000,000 g/mol; and the hydrophilic small-molecule crosslinking agent contains 2-4 thiol functional groups.

The method for preparing a porous polymer semipermeable membrane as described above, wherein the structural formula of the small-molecule crosslinking agent containing two thiol functional groups is one of

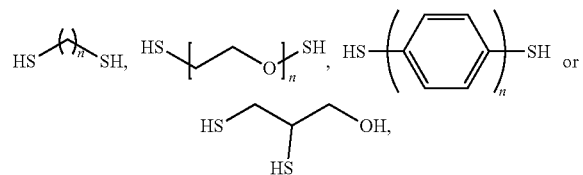

where n=1-10;

the structural formula of the small-molecule crosslinking agent containing three thiol functional groups is

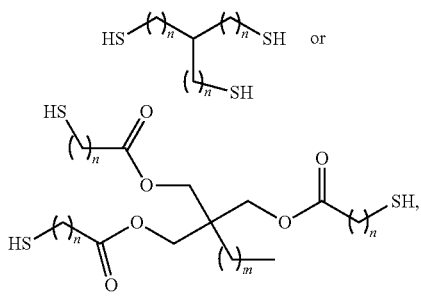

where n=1-10, m=0-5, and the thiol branches are identical or different in length;

the structural formula of the small-molecule crosslinking agent containing four thiol functional groups is:

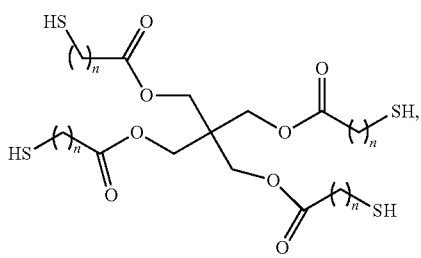

where n is 1-10, and the thiol branches are identical or different in length.

The method for preparing a porous polymer semipermeable membrane as described above, wherein the hydrophobic polynorbornene polymer and the hydrophilic small-molecule crosslinking agent are used in a ratio of 10:1 to 1:20 according to the molar ratio of C=C:—SH; the solvent is one or a mixture of any two of tetrahydrofuran, ethanol, propanol, isopropanol, butanol, ethylene glycol and water; the mass concentration of the hydrophobic polynorbornene polymer in the coating solution is 1%-25%.

The method for preparing a porous polymer semipermeable membrane as described above, wherein the coating is dip coating, spin coating, knife coating or spray coating; the coating is carried out at an ambient temperature of 15-60° C.; and the two drying steps are both carried out at 15-80° C. for 1 min to 2 h (the higher the drying temperature, the shorter the time for forming the porous structure, but if the temperature is too high, the formation of the porous structure will be affected, because as the temperature rises, the activity of the polymer chain also increases, and the small-molecule crosslinking agent may also evaporate, thus affecting the formation of the porous structure).

The method for preparing a porous polymer semipermeable membrane as described above, wherein the coating is carried out at an ambient temperature of 25-50° C.; after the first drying step, the membrane is placed in a gaseous solvent environment to further promote the phase separation between the hydrophobic component and the hydrophilic component, and the gaseous solvent is a solvent used for dissolving hydrophobic polynorbornene polymers (such as tetrahydrofuran, ethanol, propanol, butanol).

The method for preparing a porous polymer semipermeable membrane as described above, wherein the crosslinking is UV crosslinking or heat crosslinking of the polymer semipermeable membrane coated on the surface of the biosensor electrode; the UV crosslinking is carried out at a wavelength of 250-400 nm; and the heat crosslinking is carried out at 50-80° C. for 0.5-4 h.

A porous polymer semipermeable membrane prepared by any one of the method as described above.

The porous polymer semipermeable membrane as described above, wherein the membrane has a thickness of 200 nm-100 μm, and preferably 1-20 μm.

As compared with the prior art, the present invention has the following beneficial effects:

The present invention provides a porous polymer semipermeable membrane, which is finally formed having a porous structure. The hydrophobicity of the polymer in the porous polymer semipermeable membrane makes the semipermeable membrane have good adhesion to the sensor surface, and the porous structure can ensure that biological substances can diffuse to the sensor surface. The formation of the porous structure can be effectively controlled by controlling the difference in hydrophilicity between the hydrophobic polynorbornene polymer and the hydrophilic small-molecule crosslinking agent, the ratio of them and the environmental parameters in the process of phase separation, thereby adjusting the diffusion rate of biological substances in the semipermeable membrane without changing the thickness of the polymer membrane significantly.

DESCRIPTION OF THE EMBODIMENTS

Figure 1:
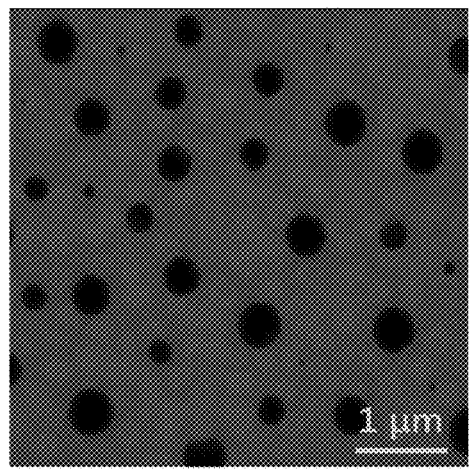
FIG. 1 shows the surface morphology of a porous polymer semipermeable membrane as analyzed by an atomic force microscope.

Example 1 of the Present Invention: Method for Preparing a Porous Polymer Semipermeable Membrane Poly(N-n-butyloxynorbornene imide) (molecular weight: 100,000 g/mol) and pentaerythritol tetramercaptoacetate (molar ratio C=C:—SH=1:4) were dissolved in a mixed solvent of tetrahydrofuran/n-butanol ($V_{THF}$:$V_{n-butanol}$=1:4) to form a coating solution (the mass percentage concentration of the polymer poly(N-n-butyloxynorbornene imide was 10%). A biosensor was immersed into the coating solution, and a layer of polymer membrane was formed on the surface of the biosensor electrode by dip coating at 30° C., dried at 30° C. for 60 min, during which the hydrophobic component and the hydrophilic component underwent phase separation. The resultant polymer membrane was subjected to UV crosslinking at a wavelength of 365 nm, and an energy density of 25 mW·cm$^{-2}$ for 4 min. Thereafter, the biosensor was immersed into n-butanol for 1 min to remove unreacted pentaerythritol tetramercaptoacetate, and dried at 30° C. for 60 min to obtain a porous polymer semipermeable membrane with a thickness of 12 μm.

Example 2: Method for Preparing a Porous Polymer Semipermeable Membrane

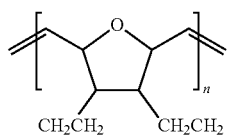

(molecular weight: 50,000 g/mol) and

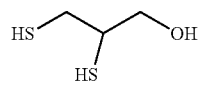

(molar ratio C=C:—SH=1:20) were dissolved in a mixed solvent of tetrahydrofuran/isopropanol ($V_{THF}$:$V_{isopropanol}$=1:1) to form a coating solution (the mass percentage concentration of the polymer

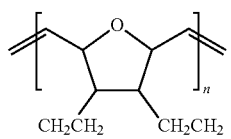

was 10%). The coating solution was applied onto the surface of a biosensor electrode by knife coating at 25° C., and dried at 30° C. for 30 min, during which the hydrophobic component and the hydrophilic component underwent phase separation. The resultant polymer membrane was subjected to UV crosslinking at a wavelength of 254 nm, and an energy density of 25 mW·cm$^{-2}$ for 6 min. Thereafter, the biosensor was immersed into ethanol for 1 min to remove unreacted

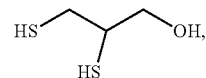

and re-dried at 30° C. for 120 min to obtain a porous polymer semipermeable membrane with a thickness of 13 μm.

Example 3: Method for Preparing a Porous Polymer Semipermeable Membrane

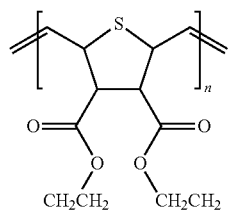

(molecular weight: 20,000 g/mol) and

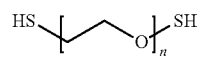

(molar ratio C=C:—SH=1:2) were dissolved in isopropanol as a solvent to form a coating solution (the mass percentage concentration of the polymer

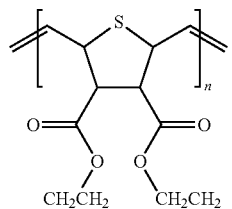

was 2%). The coating solution was applied onto the surface of a biosensor electrode by spin coating at 20° C., and dried at 40° C. for 30 min, during which the hydrophobic component and the hydrophilic component underwent phase separation. The resultant polymer membrane was heated for crosslinking at 80° C. for 1 h. Thereafter, the biosensor was immersed into ethanol for 10 s to remove unreacted

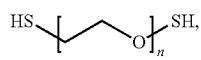

and dried at 40° C. for 60 min to obtain a porous polymer semipermeable membrane with a thickness of 350 nm.

Example 4: Method for Preparing a Porous Polymer Semipermeable Membrane

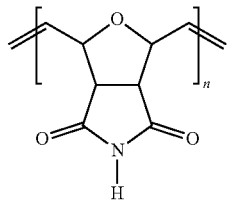

(molecular weight: 2,000,000 g/mol) and

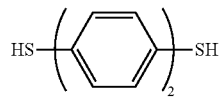

(molar ratio C═C:—SH=1:6) were dissolved in ethanol as a solvent to form a coating solution (the mass percentage concentration of the polymer

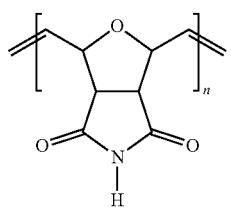

was 20%). The coating solution was applied onto the surface of a biosensor electrode by spray coating at 35° C., and dried at 50° C. for 120 min, during which the hydrophobic component and the hydrophilic component underwent phase separation. The resultant polymer membrane was heated for crosslinking at 80° C. for 120 min. Thereafter, the biosensor was immersed into ethanol for 1 min to remove unreacted

and dried at 50° C. for 120 min to obtain a porous polymer semipermeable membrane with a thickness of 70 μm.

Example 5: Method for Preparing a Porous Polymer Semipermeable Membrane

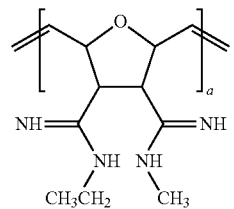

(molecular weight: 100,000 g/mol) and polythiol (molar ratio C═C:—SH=1:5) were dissolved in propanol as a solvent to form a coating solution (the mass percentage concentration of the polymer

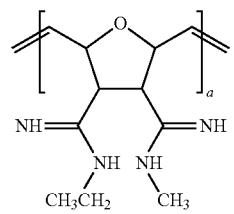

was 15%). A biosensor was immersed into the coating solution, and the coating solution was applied onto the surface of the biosensor electrode by dip coating at 35° C., and dried at 20° C. for 1 h, during which the hydrophobic component and the hydrophilic component underwent phase separation. The resultant polymer membrane was subjected to UV crosslinking at a wavelength of 365 nm, and an energy density of 25 mW·cm$^{-2}$ for 8 min. Thereafter, the biosensor was immersed into ethanol for 1 min to remove unreacted polythiol, and re-dried at 20° C. for 1 h to obtain a porous polymer semipermeable membrane with a thickness of 12 μm.

Example 6: Method for Preparing a Porous Polymer Semipermeable Membrane

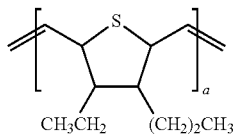

(molecular weight: 300,000 g/mol) and

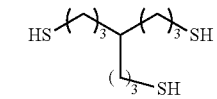

(molar ratio: C═C:—SH=9:1) were dissolved in tetrahydrofuran as a solvent to form a coating solution (the mass percent concentration of the polymer

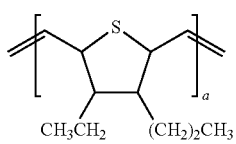

was 15%). A biosensor was immersed into the coating solution, and the coating solution was applied onto the surface of the biosensor electrode by dip coating at 20° C., and dried at 20° C. for 40 min, during which the hydrophobic component and the hydrophilic component underwent phase separation, and then it was placed in saturated ethanol steam at 25° C. to further promote the phase separation between the hydrophobic component and the hydrophilic component. Then, the resultant polymer membrane was subjected to UV crosslinking at a wavelength of 300 nm, and an energy density of 20 mW·cm$^{-2}$ for 5 min. Thereafter, the biosensor was immersed in ethanol for 1 min to remove unreacted

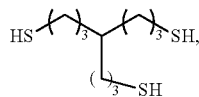

and re-dried at 30° C. for 40 min to obtain a porous polymer semipermeable membrane with a thickness of 13 μm.

Example 7: Method for Preparing a Porous Polymer Semipermeable Membrane

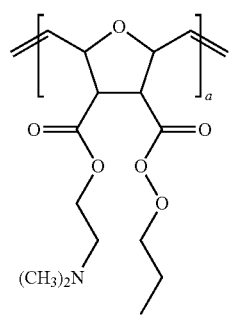

(molecular weight: 150,000 g/mol) and

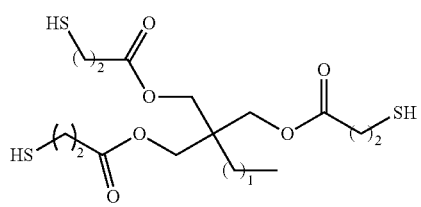

(molar ratio: C=C:—SH=10:7) were dissolved in isopropanol as a solvent to form a coating solution (the mass percentage concentration of the polymer

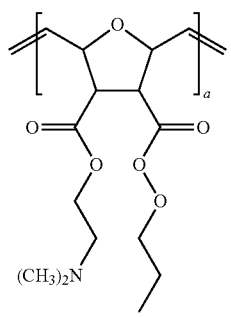

was 15%). The coating solution was applied onto the surface of a biosensor electrode by knife coating at 20° C., and dried at 35° C. for 60 min, during which the hydrophobic component and the hydrophilic component underwent phase separation. The resultant polymer membrane was subjected to UV crosslinking at a wavelength of 365 nm, and an energy density of 100 mW·cm$^{-2}$ for 5 min. Thereafter, the biosensor was immersed into ethanol for 1 min to remove unreacted

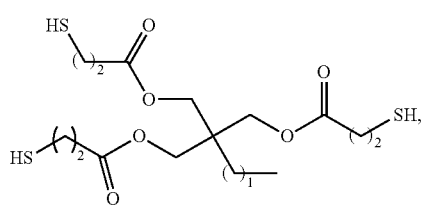

and re-dried at 35° C. for 60 min to obtain a porous polymer semipermeable membrane with a thickness of 40 μm.

Example 8: Method for Preparing a Porous Polymer Semipermeable Membrane

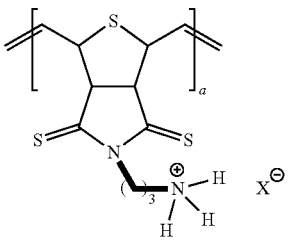

(molecular weight: 600,000 g/mol) and

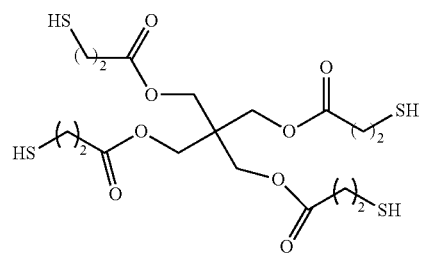

(molar ratio: C=C:—SH=10:7) were dissolved in ethanol to form a coating solution (the mass percentage concentration of the polymer

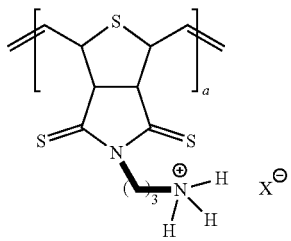

was 10%). A biosensor was immersed into the coating solution, and the coating solution was applied onto the surface of the biosensor electrode by dip coating at 25° C., and dried at 25° C. for 2 h, during which the hydrophobic component and the hydrophilic component underwent phase separation. The resultant polymer membrane was heated for crosslinking at 80° C. for 2 h. Thereafter, the biosensor was immersed into ethanol for 1 min to remove unreacted

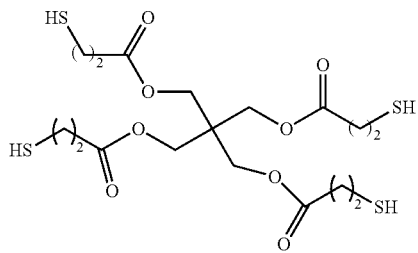

and re-dried at 25° C. for 2 h to obtain a porous polymer semipermeable membrane with a thickness of 8 μm.

In order to verify the effect of the porous polymer semipermeable membrane of the present invention, the inventor also conducted a comparative test. A control biosensor was prepared (with reduced proportion of the hydrophilic crosslinking agent, a non-porous poly(N-n-butyloxynorbornene imide) membrane was formed on an identical biosensor by coating), and compared with the biosensor with the porous polymer semipermeable membrane obtained in Example 1 in terms of properties.

Experimental Example

I. Porous Structure of Polymer Semipermeable Membrane

The thickness of the porous polymer semipermeable membrane obtained in Example 1 was about 12 μm as measured by the Filmetrics F40 spectral measurement system. FIG. 1 shows the results of AFM characterization of the surface of the polymer membrane. As shown in FIG. 1, the enriched hydrophilic small molecules formed droplets distributed in the hydrophobic polymer membrane structure, which, after being removed, leaded to the porous structure with dark circular spots in the membrane.

Figure 2:
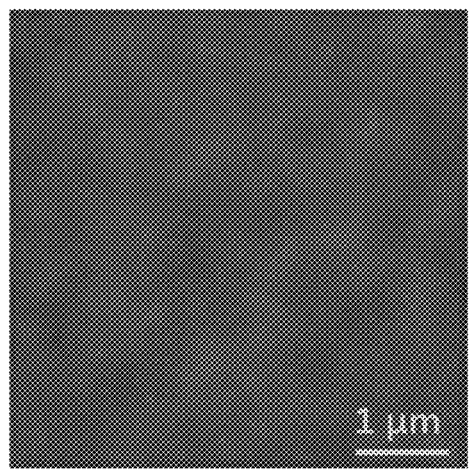
FIG. 2 shows the surface morphology of a non-porous polymer semipermeable membrane as analyzed by an atomic force microscope.

The thickness of the non-porous polymer membrane was 6 μm as measured by the Filmetrics F40 spectral measurement system. FIG. 2 shows the results of AFM characterization of the surface of the non-porous polymer membrane.

II. The Results of Comparative Experimental on Swelling Degree of Polymer Semipermeable Membranes 1. Experimental content The swelling degree of the polymer membrane in water was measured by the surface plasmon resonance experiment.

2. Experimental Results

The swelling degree of non-porous poly(N-n-propyloxynorbornene imide) in phosphate buffer was 109%, so it is difficult for glucose to diffuse through this highly hydrophobic semipermeable membrane and reach the electrode surface to produce current response. The swelling degree of the porous poly(N-n-butyloxynorbornene imide) membrane in phosphate buffer was 111%, which is only slightly higher than that of the non-porous membrane.

3. Conclusion

From the experimental results, it can be seen that the swelling degree of the porous poly(N-n-butyloxynorbornene imide) membrane is not much different from that of the non-porous membrane in water, and the polymer network framework of the porous membrane maintains the hydrophobicity of poly(N-n-butyloxynorbornene imide).

III. Comparative Experiment on the Response of Biosensor to Change of Glucose Concentration in Solution 1. Experimental Materials The biosensor with a porous polymer semipermeable membrane obtained in Example 1;

The same raw materials as those in Example 1 were used to obtain a biosensor with a non-porous polymer membrane (Comparative Example);

The biosensor is based on PET, and a three-electrode structure is formed by ink-jet printing gold conductive ink: the working electrode and the reference electrode are located on the front of the biosensor, glucose oxidase is attached to the surface of the working electrode, and Ag/AgCl forms the reference electrode; the gold conductive layer on the back side of the sensor forms the counter electrode.

2. Experimental Content

The sensor was placed in phosphate buffer with glucose to measure the response of the sensor to the change of glucose concentration.

3. Experimental Results

Figure 3:
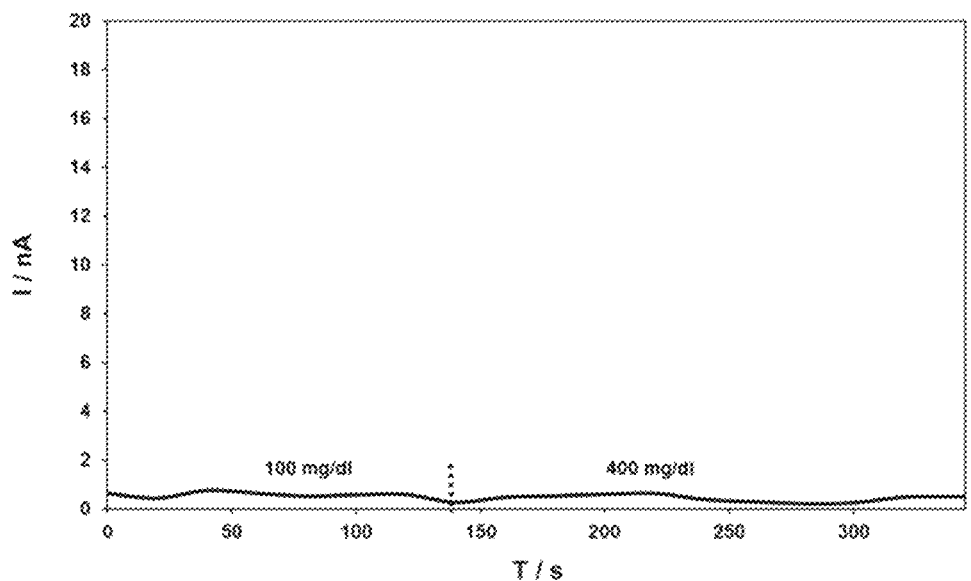
FIG. 3 shows the response to glucose concentration of a biosensor coated with a non-porous polymer semipermeable membrane.
Figure 4:
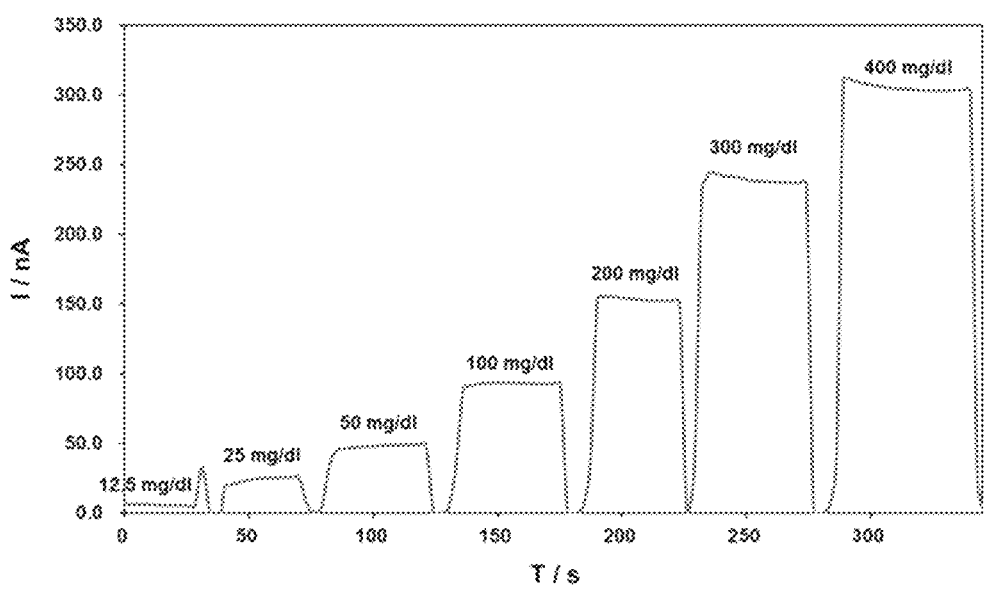
FIG. 4 shows the response to glucose concentration of a biosensor coated with a porous polymer semipermeable membrane.

The biosensor with a non-porous polymer membrane having a thickness of 6 μm failed to respond to the change of glucose concentration in the solution, as shown in FIG. 3; by contrast, the biosensor with the porous polymer semipermeable membrane could quickly respond to the change of glucose concentration in the solution, as shown in FIG. 4.

In the above-mentioned comparative experiment on swelling degree, the swelling degree of the porous polymer membrane was not much higher than that of the control, which couldn't significantly improve the diffusion rate of glucose in the semipermeable membrane. In the comparative experiment on the response to change of glucose concentration of biosensors with porous and non-porous polymer semipermeable membranes with different thicknesses, even though the thickness of the porous polymer semipermeable membrane was twice that of the non-porous polymer membrane, the porous polymer semipermeable membrane could still significantly improve the diffusion rate of glucose and ensure the responsiveness of biosensors.

What is claimed is:

1. A method for preparing a porous polymer semipermeable membrane, comprising the following steps:
   mixing and dissolving a hydrophobic polynorbornene polymer and a hydrophilic small-molecule crosslinking agent containing a thiol functional group, in a solvent capable of dissolving both of them, to obtain a coating solution;

applying the coating solution on the surface of a biosensor electrode and then drying, wherein during the drying process, the hydrophobic component and the hydrophilic component undergo phase separation;

forming a membrane and carrying out crosslinking, removing unreacted hydrophilic small-molecule crosslinking agent, and re-drying to obtain a porous polymer semipermeable membrane.

2. The method for preparing a porous polymer semipermeable membrane according to claim 1, wherein the hydrophobic polynorbornene polymer has a structural formula as shown below:

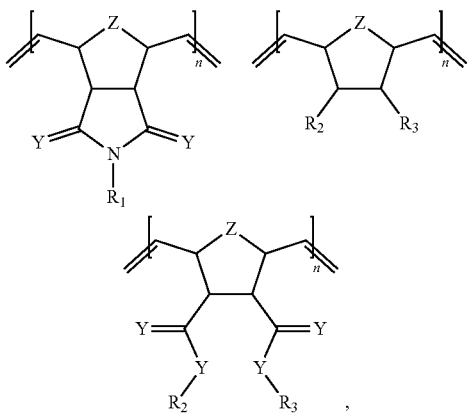

where Z is $CH_2$, $CH_2CH_2$, O, S, $N-R_4$ or $C=C(R_5R_6)$;
Y is O, S or NH;
$R_1$ is H, a linear/branched/cyclic hydrocarbyl group, a lipid/ether-containing group or

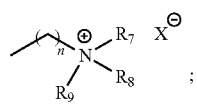

$R_2$ and $R_3$ are selected from a group consisting of linear/branched/cyclic hydrocarbyl groups and

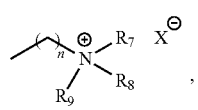

and $R_2$ and $R_3$ are identical or different;
$R_4$ is a linear/branched/cyclic hydrocarbyl group;
$R_5$ is H or an alkyl group, $R_6$ is H or an alkyl group, and $R_5$ and $R_6$ are identical or different;
n=1-10, $R_7$ is H or an alkyl group, $R_8$ is H or an alkyl group, $R_9$ is H or an alkyl group, and $R_7$, $R_8$ and $R_9$ are identical or different;
the polynorbornene polymer has a molecular weight of 10,000 g/mol-2,000,000 g/mol; and
the hydrophilic small-molecule crosslinking agent contains at least two thiol functional groups.

3. The method for preparing a porous polymer semipermeable membrane according to claim 2, wherein the molecular weight of the polynorbornene polymer is 200,000 g/mol-1,000,000 g/mol; and the hydrophilic small-molecule crosslinking agent contains 2-4 thiol functional groups.

4. The method for preparing a porous polymer semipermeable membrane according to claim 3, wherein the structural formula of the small-molecule crosslinking agent containing two thiol functional groups is

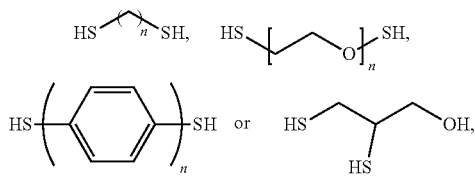

where n=1-10;
the structural formula of the small-molecule crosslinking agent containing three thiol functional groups is

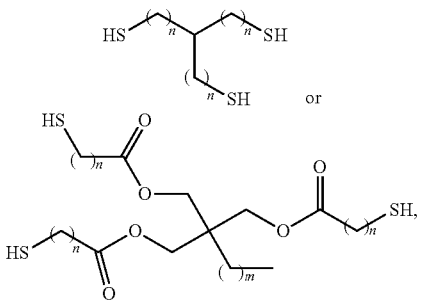

where n=1-10, m=0-5, and the thiol branches are identical or different in length;
the structural formula of the small-molecule crosslinking agent containing four thiol functional groups is:

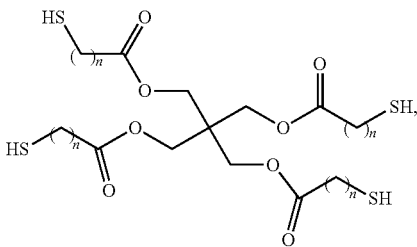

where n is 1-10, and the thiol branches are identical or different in length.

5. The method for preparing a porous polymer semipermeable membrane according to claim 1, wherein the hydrophobic polynorbornene polymer and the hydrophilic small-molecule crosslinking agent are in such a ratio that the molar ratio of C=C:—SH is from 10:1 to 1:20; the solvent is one or a mixture of any two selected from the group consisting of tetrahydrofuran, ethanol, propanol, isopropanol, butanol, ethylene glycol and water; the mass concentration of the hydrophobic polynorbornene polymer in the coating solution is 1%-25%.

6. The method for preparing a porous polymer semipermeable membrane according to claim 1, wherein the coating is dip coating, spin coating, knife coating or spray coating; the coating is carried out at an ambient temperature of 15-60° C.; and the two drying steps are both carried out at 15-80° C. and each drying step lasts for 1 min to 2 h.

7. The method for preparing a porous polymer semipermeable membrane according to claim 6, wherein the coating is carried out at an ambient temperature of 25-50° C.; after the first drying step, the membrane is placed in a gaseous solvent environment to further promote the phase separation between the hydrophobic component and the hydrophilic component, and the gaseous solvent is the solvent used for dissolving the hydrophobic polynorbornene polymer.

8. The method for preparing a porous polymer semipermeable membrane according to claim 1, wherein the crosslinking is UV crosslinking or heat crosslinking of the polymer semipermeable membrane coated on the surface of the biosensor electrode; the UV crosslinking is carried out at a wavelength of 250-400 nm; and the heat crosslinking is carried out at 50-80° C. for 0.5-4 h.

* * * * *